United States Patent [19]

Carter et al.

[11] Patent Number: 5,033,555
[45] Date of Patent: Jul. 23, 1991

[54] FLUID CYLINDER POWERED TOOL

[75] Inventors: Thomas J. Carter, Utica; Ronald B. Michalski, Troy; Robert W. Cetnarowski, Pearl Beach, all of Mich.

[73] Assignee: Utica Enterprises, Inc., Sterling Heights, Mich.

[21] Appl. No.: 333,443

[22] Filed: Apr. 5, 1989

[51] Int. Cl.$^5$ .............................................. E21B 1/00
[52] U.S. Cl. ...................................... 173/52; 173/50; 901/19
[58] Field of Search ................... 414/751; 901/14, 19, 901/25; 173/52, 50, 51

[56] References Cited

U.S. PATENT DOCUMENTS

3,212,649 10/1965 Johnson et al. ................... 901/25 X
4,678,393 7/1987 Mink ................................. 901/19 X
4,831,231 5/1989 Pelle ................................. 901/14 X

Primary Examiner—Timothy V. Eley
Assistant Examiner—Willmon Fridie, Jr.
Attorney, Agent, or Firm—Remy J. VanOphem

[57] ABSTRACT

An apparatus for providing a reciprocating motion. The apparatus has a housing block that contains two movable arms in spaced apart relationship to one another. The movable arms are each controlled by independently attached fluid driven actuator cylinders that are mounted externally of the housing block. Tools for the altering of a workpiece may be attached to one or both ends of the movable arms. An embodiment utilizes a rack and pinion gear arrangement to immobilize any imbalance in forces that may exist when the movable arms are biased against a workpiece.

18 Claims, 3 Drawing Sheets

_Fig-1_

_Fig-4_

_Fig-5_

FLUID CYLINDER POWERED TOOL

BACKGROUND OF THE INVENTION

1. Field of the Invention

The present invention relates to an actuator powered apparatus that has application in assembly plants for clamping, welding and other assembly functions that are common in the manufacture and assembly of vehicles such as, for example, automobiles. More particularly, the invention is related to a dual action fluid powered apparatus that is equipped with two elongate arms that are spaced apart from one another. The elongate arms operate independently of one another. The elongate arms are positioned within a common housing that supports fluid drive cylinders that are attached to each elongate arm. In one embodiment, a rack gear and pinion gear arrangement is utilized to immobilize the elongate arms, thus, minimizing drift of the elongate arms because of an imbalance in forces applied to the elongate arms.

2. Description of the Prior Art

The prior art is replete with the utilization of single hydraulic and pneumatic cylinders in conjunction with mechanical devices. Many prior applications of fluid drive cylinders employ the telescoping variety when one cylinder acts within another cylinder to enhance a given force. Also, the prior art discloses a variety of devices that employ a rack and gear combination to change arcuate motion to a translatory function, or vice versa.

Figure 1:
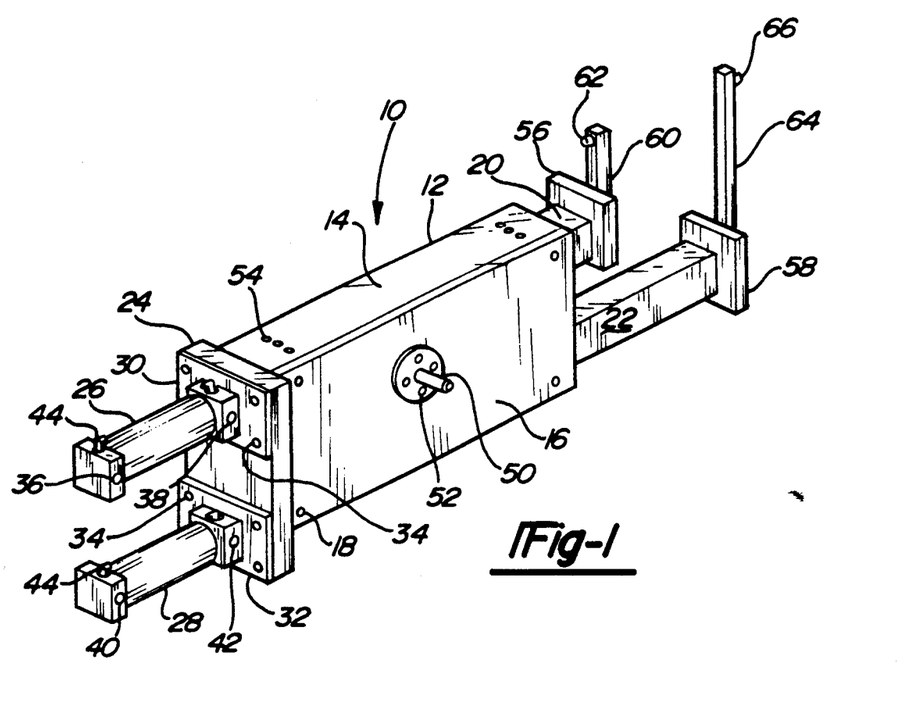
FIG. 1 is a perspective view that shows the dual action apparatus of the present invention.

The present invention differs from the rack and pinion gear driven load grip device that is shown and described in U.S. Pat. No. 2,595,131, entitled "Load Grip Means for Trucks and the Like" issued Apr. 29, 1952, to Leslie G. Ehmann. FIG. 1 of the Ehmann patent depicts a pair of spaced apart cylinders 26 that are oriented parallel to one another. In cross-section, the cylinders are square in configuration and have a cylindrical bore located along the longitudinal axis of the cylinder. One of the four sides of each cylinder contains a rack gear. The rack gears of the cylinders mesh with the teeth of a pinion gear that is attached to a flange. Each one of the cylinders is powered by a piston that is connected to a piston rod. The piston and the piston rod are contained within the cylinder in the usual fashion, with only the end of the piston rod protruding from the cylinder. The ends of the piston rods are fixed, thus, when fluid pressure is applied to the piston head, the cylinder with its attached rack gear moves in a linear direction. The pinion gear is fixed against rotation by its attached flange. Consequently, when fluid pressure is applied to the piston heads, the rack gear containing cylinders walk around the teeth of the fixed pinion gear. In this manner, a torque is developed to rotate the entire plate to which the cylinders and their accompanying pistons are attached.

The present invention differs from the above described device in that the power generating fluid driven cylinders are separate from the rods or elongate arms that contain the rack gear teeth. Thus, any malfunction of the piston head, or its seals, does not affect the block assembly that houses the elongate arms. Then, too, the present invention provides elongate arms that can move independently of one another. In the previously discussed prior art device, the two arms are coupled together in a positive manner through the common pinion gear.

Figure 3:
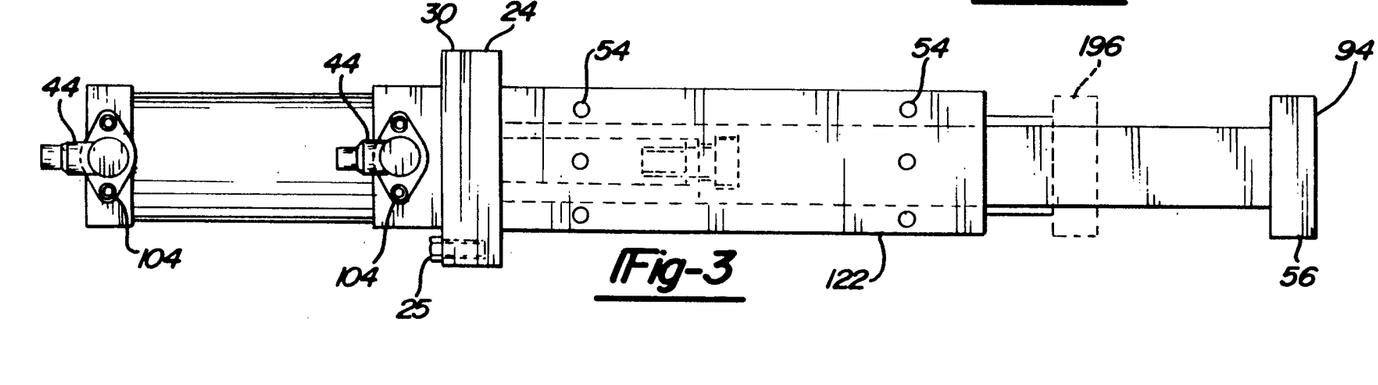
FIG. 3 is a top plan view of the apparatus depicted in FIG. 2.

In U.S. Pat. No. 2,605,751, entitled "Fluid Pressure Tool Slide Control Assembly" issued Aug. 5, 1952, to Richard D. Perry et al, there is shown an apparatus for controlling the feed of a machine cutting tool. FIG. 3 of Perry et al shows a housing 11 that contains two piston chambers 19 and 20 that are in tandem. Each piston chamber 19 and 20 contains a piston head that is connected to a common piston rod 65. The smaller piston 63 is driven hydraulically with the fluid medium being oil. The oil can be metered very slowly to either side of the piston 19, providing for very slow axial movement of the piston rod. The larger piston 20 is driven pneumatically with the fluid medium being air. A cutting tool is responsive to the axial movement of the piston rod 65. The cutting tool can be moved into and out of engagement with a workpiece by utilizing air pressure on one side or the other of the piston 20. Incremental movement of the cutting tool is then achieved by metering oil to one side or the other of the piston 19. Thus, the tool is fed rapidly by the pneumatic cylinder from its rest position substantially into engagement with the workpiece and is then fed slowly at a rate determined by the setting of a throttling valve which forms a part of the hydraulic speed control.

The present invention differs from the above described cutting control for a tool in that two movable tool carrying elongate arms are in separate chambers, not in tandem as in the Perry et al reference. In one embodiment of the present invention, very precise control of the tool is achieved by means of a rack and gear arrangement.

SUMMARY OF THE PRESENT INVENTION

The present invention encompasses a dual action fluid actuated device for use in a variety of applications where a generally linear equal and opposite compressive or tensile force is applied to shape, form or hold a workpiece.

The invention includes a housing of elongate block configuration that contains two spaced apart elongate arm guides in the form of milled grooves. The elongate arm guides traverse the entire length of the housing and are open at their opposite ends. Each one of the elongate arm guides within the housing contains an elongate arm. One end of each elongate arm protrudes from the housing and is adapted for the attachment of a variety of tools that can be affixed thereto. Fluid driven cylinders are attached to the housing in line with each elongate arm. A cylinder rod extends from each fluid driven cylinder and is coupled to each elongate arm to control the linear motion thereof. An embodiment of the present invention utilizes a housing block that contains a pair of nonparallel grooves that permit the cantilevered ends of the elongate arms to converge on a small area of a workpiece. Then, too, the independent control and motion of each elongate arm increases the overall versatility of the apparatus. In another embodiment of the instant invention, the elongate arms are independently controlled for optimum movement and an additional feature is incorporated for precise control of the elongate arms. The control feature encompasses a rack gear and pinion gear concept. The elongate arms each contain a gear segment in the form of a rack gear that extends over a substantial portion of the longitudinal extent of the elongate arms. A pinion gear is mounted for rotation and translation within the housing block and is positioned intermediate the two elongate arm guides. The teeth of the pinion gear extend into each of the elongate arm guides within the housing block and mesh with the teeth of each elongate arm and rack gear. In addition, the pinion gear assembly can move longitudinally within the housing block. At any particular time, the pinion gear can undergo a state of rotation and translation. The translation of the pinion gear can be immobilized, providing a compensating lock and force equalizer to minimize the movement of the elongate arms when they are in contact with a workpiece.

A primary object of the present invention is to provide a force generating dual action apparatus with independently controlled arms that is accurate and can function with a variety of tools attached thereto.

Another object of the present invention is to provide an apparatus that uses a double rack and pinion gear to compensate for any unequal forces that may occur in the individual arms when in contact with a workpiece.

A further object of the present invention is to provide a force generating dual action apparatus that can be driven by different fluid mediums.

Another object of the present invention is to provide an apparatus that contains two elongated arms that move independently of each other yet are interconnected with one another.

Still another object of the present invention is to provide a tool carrying apparatus that contains a minimum of moving parts and seals.

A further object of the present invention is to reduce the work cycle time in that both elongate arms move tools or clamps simultaneously into and out of engagement with a workpiece.

Another object of the present invention is to eliminate the whipping or arcing movements associated with non-linear motion devices.

A further object of the present invention is to provide an apparatus having increased smoothness of performance without decreasing its overall accuracy.

Further objects and advantages of the present invention will become apparent from the following description and the appended claims, reference being made to the accompanying drawings forming a part of this specification, wherein like reference characters designate corresponding parts in the several views.

DETAILED DESCRIPTION OF THE PREFERRED EMBODIMENT

Referring now to the drawings and more particularly to FIG. 1, there is illustrated in perspective a dual action apparatus indicated generally by the numeral 10 in the form of a tool adapted for a clamping function. The tool shown in FIG. 1 is adapted for a top support, such as suspension from a cable system. A side mount for a platform or pivotal mounting system is also shown.

Figure 2:
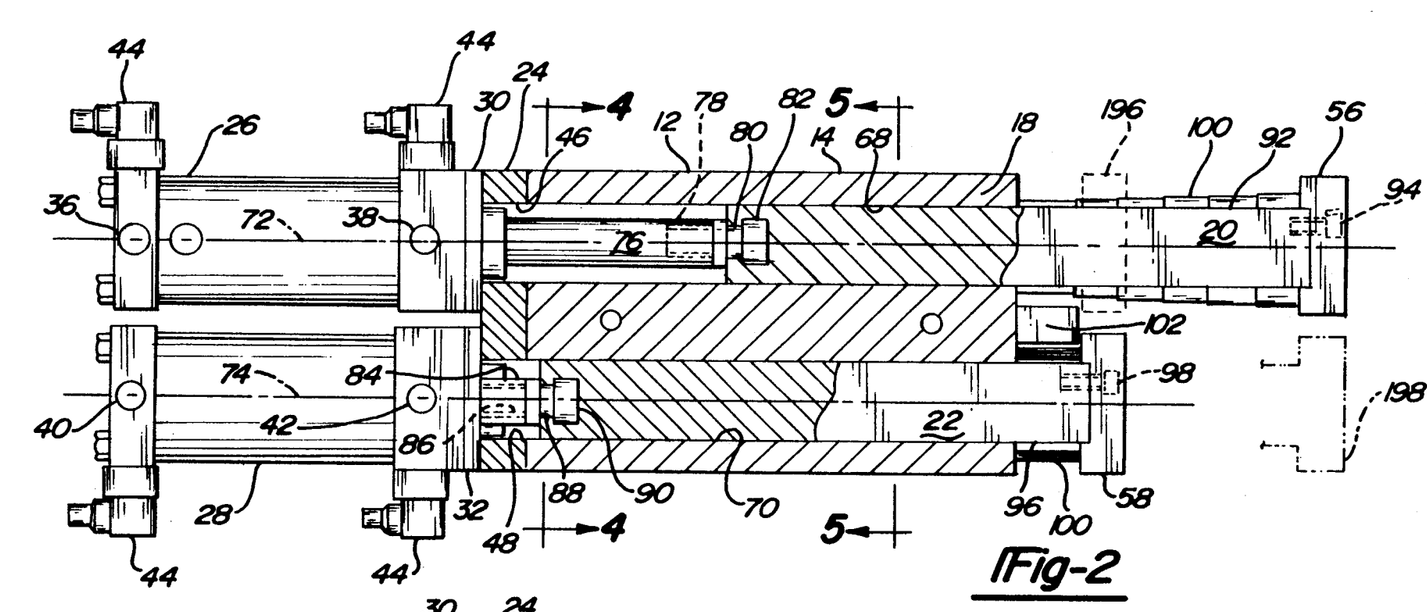
FIG. 2 is a cross-sectional side view, showing the independently movable elongate arms and their position within the housing block.

With reference to FIG. 1, a housing block 12 of the overall apparatus 10 is shown in elongate form. The housing block 12 is of two part construction in that a milled portion 14 has attached thereto a cover plate 16 which is attached by a plurality of bolts 18. Top and bottom elongate arms 20 and 22 are positioned longitudinally within the housing block 12 and are spaced one from the other in generally parallel relationship. An end cap 24 not only prevents the ingress of contaminants, such as dirt, into the interior of the overall apparatus 10, but the end cap 24 also serves as a mounting plate for a power source, such as a pair of fluid actuated cylinders 26 and 28. The fluid actuated cylinders 26 and 28 contain respective flanges 30 and 32 that are bolted to the exterior of the end cap 24 by a series of bolts 34. The fluid actuated cylinder 26 has a plurality of fluid coupling ports 36 and 38 that permit the introduction of a fluid medium to both sides of a piston that is integral with the fluid actuated cylinder 26. In a similar manner, the fluid actuated cylinder 28 has a plurality of fluid coupling ports 40 and 42 that act as described above. The fluid actuated cylinders are also equipped with position sensors 44. Since the fluid actuated cylinders 26 and 28 must have communication with the interior of the housing block 12 apertures 46 and 48 are provided in the end cap 24, as shown in FIG. 2. A pivotal support member 50 is attached to each side of the housing block 12 by a plurality of bolts 52 to provide an alternate support system for the embodiment of the invention depicted in FIG. 1. Apertures 54 are provided in the top of the housing block 12 for mounting of the overall apparatus 10, if the particular application requires such suspension.

In FIG. 1, the top elongate arm 20 contains an attachment plate 56 attached to its free end. In a similar manner, an attachment plate 58 is attached to the free end of the bottom elongate arm 22. By way of illustration, a clamp bracket 60 is affixed to the attachment plate 56 at the end of the top elongate arm 20. A cushion pad 62 is attached to the end of the clamp bracket 60. In a similar manner, the bottom elongate arm 22 has attached at its free end a clamp bracket 64. A cushion pad 66 is attached to the clamp bracket 64 so that the cushion pad 66 is in axial alignment with the cushion pad 62. It is to be understood that other tool combinations can also be used in place of the clamping arrangement described above.

FIG. 2 is a cross-sectional side view of the overall apparatus that shows the arrangement of the elongate arms 20 and 22 and their independently connected fluid actuated cylinders 26 and 28. The milled portion 14 of the housing block 12 contains a top elongate arm guide or groove 68. The elongate arm 20 is positioned within the top elongate arm guide 68. The top elongate arm guide 68 extends from end to end of the milled portion 14 and has dimensional tolerances such that the top elongate arm 20 can slide freely therein. In a similar manner, the milled portion 14 of the housing block 12 contains a bottom elongate arm guide or groove 70 that extends over the longitudinal expanse of the milled portion 14 and is oriented generally parallel to the top elongate arm guide 68. The bottom elongate arm 22 is positioned in the bottom elongate arm guide 70. The bottom elongate arm 22 also slides freely within the confinement of the bottom elongate arm guide 70. Thus, the top and bottom elongate arm guides 68 and 70 provide independent guides for the elongate arms 20 and 22. The top and bottom elongate arms 20 and 22 are generally rectangular in cross-sectional configuration. The fluid actuated cylinders 26 and 28 are attached to the housing block 12 so that their longitudinal axes 72 and 74 coincide with the longitudinal axes of the top and bottom elongate arms 20 and 22. The fluid actuated cylinder 26 has a cylinder rod 76 that has attached thereto a fitment 78. The fitment 78 has a reduced section or neck 80 adjacent to an enlarged head 82 that is cylindrical in configuration. The actual coupling of the fitment 78 to the top elongate arm 20 will be discussed further hereinbelow. The bottom fluid actuated cylinder 28 has a cylinder rod 84, with a fitment attachment 86 attached thereto similar to the fitment 78. A neck section 88 and a head 90 are also a part of the fitment 86.

Attention is now directed toward the right-hand side of FIG. 2. The cantilevered end 92 of the top elongate arm 20 has the attachment plate 56 attached thereto by bolts 94. In a similar manner, the bottom elongate arm 22 has a cantilevered end 96 to which the attachment plate 58 is coupled by bolts 98. The cantilevered ends 92 and 96 of the respective top and bottom elongate arms 20 and 22 each have a collapsible shield 100 circumscribing their exposed ends. The shields 100 are attached to the attachment plates 56 and 58 as well as to the milled portion 14 of the housing block 12. The collapsible shields 100 are used to protect the surfaces of the top and bottom elongate arms 20 and 22 from particulate matter such as the airborne fallout from an adjacent welding operation.

In order to provide a positive stop for the top and bottom elongate arms 20 and 22, a stop block 102 is attached to the milled portion 14 by bolts (not shown). Thus, the stop block 102 serves to limit the retractable movement of both top and bottom elongate arms 20 and 22.

FIG. 3 is a top plan view of the overall apparatus 10 that is shown in FIG. 2. The position sensors 44 are shown at each end of the fluid actuated cylinder 26. The position sensors 44 are attached to the cylinder 26 by means of bolts 104. The series of apertures or tapped holes 54 are positioned in vertical alignment at each end of the housing block 12. The tapped holes 54 provide means for attaching a vertical lift mechanism, such as a cable sling or rigid arm, that would be utilized during production use of the overall apparatus 10.

Figure 4:
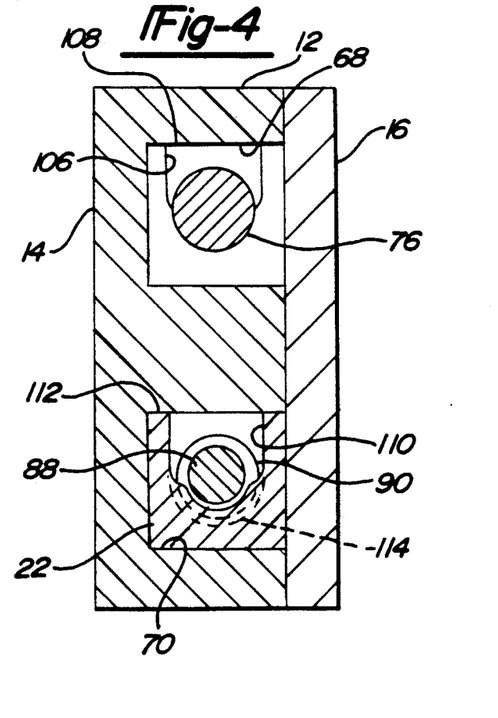
FIG. 4 is a cross-sectional view taken along section lines 4—4 of FIG. 2 that shows the coupling between the cylinder rod and the elongate arms.

FIG. 4 is a cross-sectional view taken along section lines 4—4 of FIG. 2 that shows the elongate arms 20 and 22 within their respective top and bottom elongate arm guides or grooves 68 and 70. The cover plate 16 is shown at the right-hand side of FIG. 4 where it is attached to the milled portion 14. The bottom elongate arm 22 is shown, in section, within the bottom elongate arm guide 70. Both the top and bottom elongate arms 20 and 22 are held captive within the top and bottom elongate arm guides 68 and 70 by means of the cover plate 16. However, the cover plate 16 does not interfere with the axially slidable feature of the top and bottom elongate arms 20 and 22. The end of the elongate arm 20 adjacent the fluid actuated cylinder 26 has a milled slot 106 that extends downward from a top surface 108 of the top elongate arm 20 to a position past the longitudinal axis 72. The head 82 of the fitment 78 fits into the slot 106 and is retained therein as described below with respect to the head 90. The bottom elongate arm 22 also has a milled slot 110 that extends downward from a top surface 112 of the bottom elongate arm 22 to a position past the longitudinal axis 74. The bottom of the milled slot 110 is undercut to provide a reentrant section 114. The reentrant section 114 provides a ledge for interaction with the head 90 of the fitment 86. This coupling arrangement provides for rapid connection of the fluid actuated cylinder 28 and its cylinder rod 84 to the end of the bottom elongate arm 22. As the bottom elongate arm 22 is moved to an extended position, the head 90 of the fitment 86 pushes against the end of the bottom elongate arm 22 in a positive manner. When the direction of motion of the bottom elongate arm 22 is reversed, or retracted, the enlarged head 90 of the fitment 86 engages the reentrant section 114 of the milled slot 110, thus providing a positive engagement. Thus, it becomes evident that the fitments 78 and 86 act as quick disconnect couplings.

Figure 5:
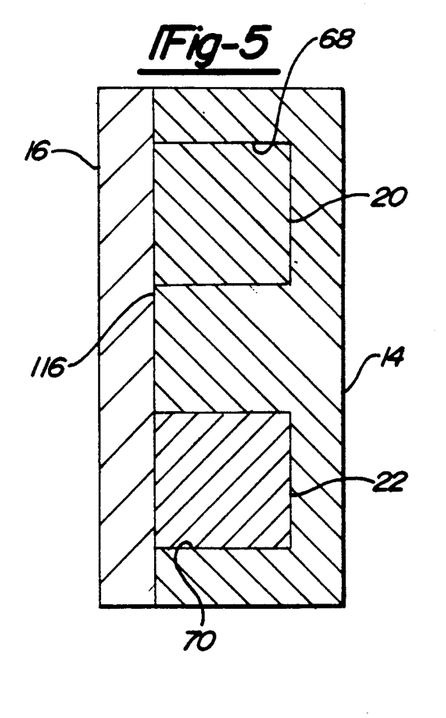
FIG. 5 is a cross-sectional view taken along section lines 5—5 of FIG. 2 that shows the elongate arms within their respective arm guides and the cover plate that retains the arms.

FIG. 5 is a cross-sectional view taken along section lines 5—5 of FIG. 2 that shows the top and bottom elongate arms 20 and 22 in their respective top and bottom elongate arm guides 68 and 70. The milled portion 14 is shown with the top elongate arm guide 68 and the bottom elongate arm guide 70 milled therein. As previously pointed out, the top and bottom elongate arm guides 68 and 70 provide guides for the top and bottom elongate arms 20 and 22. A rib 116 remains within the milled portion 14 after the top and bottom elongate arm guides 68 and 70 have been milled. The rib 116 is continuous from end to end of the milled portion 14 in this particular embodiment of the present invention. The rib 116 provides extra rigidity for the overall apparatus.

Figure 6:
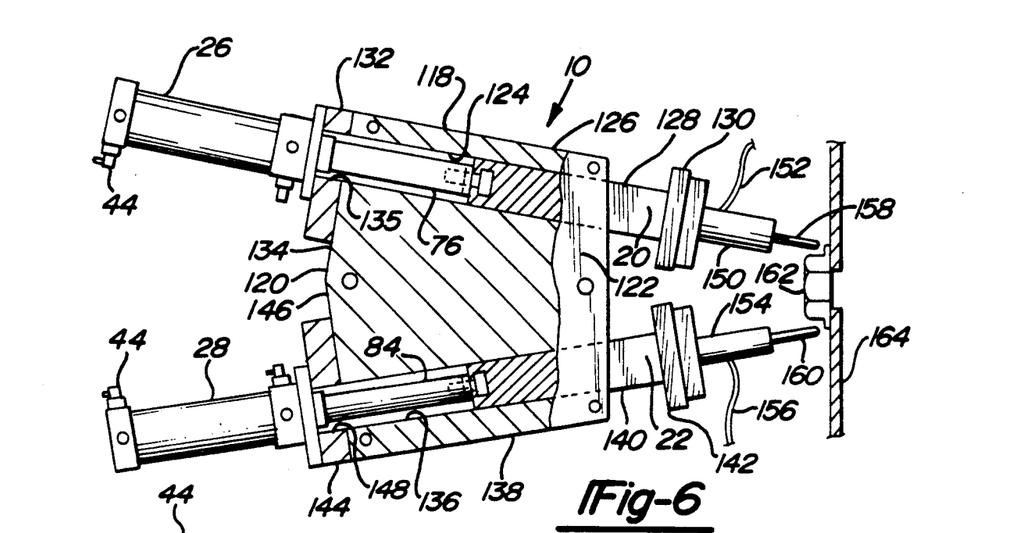
FIG. 6 is a side view, partly in section, that shows an embodiment of the invention wherein the elongate arms are in nonparallel alignment with one another.

FIG. 6 is a side view, partly in section, that shows an embodiment of the invention wherein the top and bottom elongate arms 20 and 22 are in nonparallel alignment with one another. The overall apparatus 10 has a housing block 118 that is of pentagonal configuration. The housing block 118 has a milled section 120 to which is attached a cover plate 122. The milled section 120 has a top groove 124 that is milled essentially parallel to a top surface 126 of the milled section 120. The top elongate arm 20 is positioned in the top groove 124 with its free or cantilevered end 128 extending from the housing block 118. An attachment plate 130 is attached by fasteners (not shown) to the cantilevered end 128 of the top elongate arm 20. A top end cap 132 is attached to a surface 134 of the milled section 120 by bolts (not shown). The top end cap 132 contains an aperture 135 therethrough for the installation of the fluid actuated cylinder 26. The fluid actuated cylinder 26 is attached to the top end cap 132 by appropriate fasteners. The cylinder rod 76 of the fluid actuated cylinder 26 is coupled to the end of the top elongate arm 20 as described above with reference to FIG. 2. The milled section 120 has a bottom groove 136 that is milled essentially parallel to a bottom surface 138 of the milled section 120. The bottom elongate arm 22 is positioned in the bottom groove 136 with its cantilevered end 140 extending from the housing block 118. An attachment plate 142 is attached to the cantilevered end 140 of the bottom elongate arm 22. A bottom end cap 144 is attached to the surface 146 of the milled section 120 by bolts (not shown). The bottom end cap 144 contains an aperture 148 therethrough for the installation of the fluid actuated cylinder 28. The fluid actuated cylinder 28 is attached to the bottom end cap 144 by fasteners (not shown). The cylinder rod 84 of the fluid actuated cylinder 28 is attached to the end of the bottom elongate arm 22 as has been previously described with respect to FIG. 2.

Attention s now directed to the right-hand area of FIG. 6. A top electrode holder 150 is attached to the attachment plate 130 by appropriate fasteners. A power source 152 is provided for the top electrode holder 150. A bottom electrode holder 154 is attached to the attachment plate 142 by suitable fasteners. A power source 156 is connected to the bottom electrode holder 154. Electrodes 158 and 160 are shown in the respective top and bottom electrode holders 150 and 154. The electrodes 158 and 160 are shown in close proximity to a weld nut 162 that is positioned in contact with a workpiece 164. The angular disposition of the top and bottom elongate arms 20 and 22 and the electrodes 158 and 160 carried thereby permit advantageous placing of the electrical energy to secure an adequate coupling of the weld nut 162 to the workpiece 164.

Figure 7:
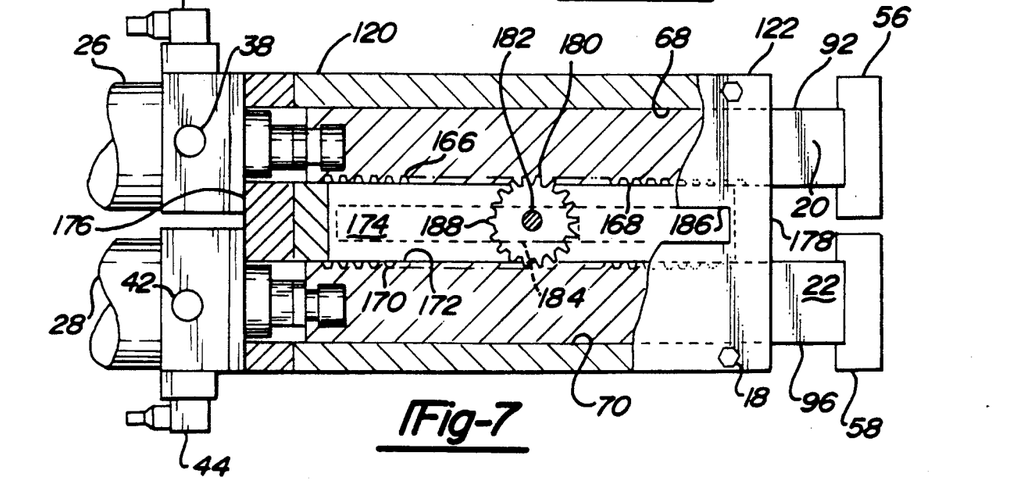
FIG. 7 is a fragmented, partly sectional side view of another embodiment of the invention that shows a rack and pinion gear coupled to the elongate arms.

FIG. 7 is a fragmented, partly sectioned, side view of another embodiment of the present invention that shows a rack and pinion gear braking system coupled to the top and bottom elongate arms 20 and 22. The milled section 120 of the housing block 118 contains the top elongate arm guide 68. The top elongate arm 20 is positioned within the top elongate arm guide 68. The top elongate arm guide 68 extends from end to end of the milled section 120 and has dimensional tolerances such that the top elongate arm 20 can slide freely therein. In a similar manner, the housing block 118 contains the bottom elongate arm guide 70 that extends over the longitudinal expanse of the milled section 120 and is oriented generally parallel to the top elongate arm guide 68. The bottom elongate arm 22 is positioned in the bottom elongate arm guide 70. The bottom elongate arm 22 also slides freely within the confinement of the bottom elongate arm guide 70. Thus, the top and bottom elongate arm guides 68 and 70 provide guides for the top and bottom elongate arms 20 and 22.

The top elongate arm 20 is generally rectangular in cross-sectional configuration. One side of the top elongate arm 20 contains an array of teeth 166 in the form of a rack gear 168. In a similar manner, the bottom elongate arm 22 also contains an array of teeth 170 in the form of a rack gear 172. The rack gears 168 and 172 are opposed to one another in spaced apart relationship. An elongate cavity 174 is milled in the milled section 120. The cavity 174 extends between web blocks 176 and 178. A pinion gear 180 is positioned within the cavity 174. The pinion gear 180 is contained on a pinion shaft 182 that is journaled within slide blocks 184. The pinion gear 180 preferably rotates freely about the pinion shaft 182. The one slide block 184 slides in a milled slot 186 that is within the cover plate 122. The other slide block 184 slides within a similar milled slot (not shown) that is in the sidewall of the milled section 120. The pinion gear 180 is equipped with an arcuate array of teeth 188 that circumscribes the pinion gear 180. The teeth 188 of the pinion gear 180 are meshed with the teeth 166 and 17) of the respective top and bottom elongate arms 20 and 22. The external su-faces of the slide blocks 184 are flush with the external surface of the cover plate 122 and the external surface of the milled section 120.

The interconnection between the fluid actuated cylinders 26 and 28 and their corresponding top and bottom elongate arms 20 and 22 have been described previously.

Figure 8:
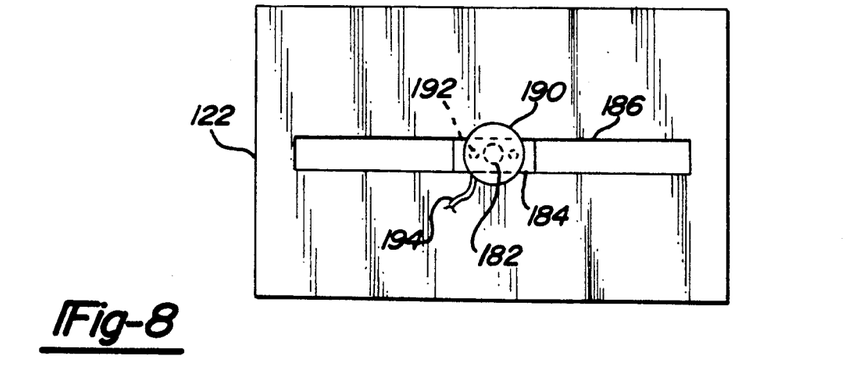
FIG. 8 is a side view that shows a cover plate with an electromagnetic lock in position against a slide bar that journals a pinion gear shaft.

FIG. 8 is a side view that shows the cover plate 122 with the milled slot 186 cut therethrough. The slide block 184 and the end of the pinion shaft 182 are also shown. An electromagnetic clutch 190 is attached by fasteners 192 to the slide block 184 so that, during its non-energized state, it slides freely with the slide block 184. The electromagnetic clutch is equipped with an electrical source 194 so that it can be energized to immobilize it against the sidewall of the cover plate 122. When the electromagnetic clutch is immobilized, it prevents the slide block 184, to which it is attached, from moving. Likewise, the pinion shaft 182 and the journaled pinion gear 180 are stopped from translating.

ASSEMBLY AND OPERATION

The assembly of the overall apparatus 10 of the present invention is fairly simple which is an asset when repairs are necessary. The top elongate arm 20 and the fluid actuated cylinder 26 are coupled by installing the head 82 of the fitment 78 into engagement with the milled slot 106. The top elongate arm 20 is then inserted into the top elongate arm guide 68 and the flange 30 of the fluid actuated cylinder 26 is attached to the end cap 24 by means of the bolts 25. In a similar procedure, the bottom elongate arm 22 and the fluid actuated cylinder 28 are pre-assembled and then inserted into the bottom elongate arm guide 70 of the milled portion 14. The cover plate 16 is then secured to the milled portion 14 by the bolts 18. The protective shields 100 are then telescoped over each of the cantilevered ends 92 and 96 of the top and bottom elongate arms 20 and 22. The attachment plates 56 and 58 are then anchored to the ends of the top and bottom elongate arms 20 and 22 by the bolts 94 and 98. The shields 100 are held in place by fasteners (not shown).

In the embodiment shown in FIG. 7, after the actuator arm subassemblies have been installed in the respective top and bottom guides, the pinion gear subassembly is then assembled. The pinion gear 180 is attached to the pinion shaft 182 by friction fit or by a key. The slide blocks 184 are then attached to each end of the pinion shaft. The pinion gear subassembly is then inserted into the cavity 174 and the rear slide block 184 is engaged in the milled slot 186 that is located in the milled section 120. The pinion gear 180 is then positioned so that it is in alignment with the center of the teeth 166 and 170 of the rack gears 168 and 172. The teeth 188 of the pinion gear 180 are then meshed with the teeth 166 and 170. The front slide block 184 is then placed in axial alignment with the housing block 118 and the cover plate 122 is installed so that the front slide block 184 is engaged in the milled slot 186 that is contained in the cover plate 122. The cover plate 122 is then secured to the milled section 120 by means of the bolts 18. Appropriate shields over the cantilevered ends 92 and 96 of the top and bottom elongate arms 20 and 22 are installed, if required, and the attachment plates 56 and 58 are attached by the bolts 94 and 98.

During the operation of the overall apparatus 10, with the illustrative clamp arrangement shown in FIG.

1, the top elongate arm 20 is moved to an extended position as shown in FIGS. 2 and 3. The movement of the top elongate arm 20 is achieved by the introduction of a fluid medium, such as air or oil, through the fluid coupling port 36. This, of course, creates a desirable pressure behind the piston head within the fluid actuated cylinder 26. The pressure created by the ingress of a fluid medium behind the piston within the fluid actuated cylinder 26 causes an extension of the cylinder rod 76. As the cylinder rod 76 moves to an extended position, the top elongate arm 20 also moves until it reaches its maximum extent as depicted in FIGS. 2 and 3. The top elongate arm 20 can move from the fully extended position to a retracted position 196 as shown in FIG. 2. The bottom elongate arm 22 has the same degree of linear motion as has been described above. The bottom elongate arm 22 can move from a fully retracted position to a fully extended position 198 as shown in FIG. 2.

The particular array of tools, such as clamp brackets 60 and 64, as shown in FIG. 1, permit the clamping of, for example, the interior of a structural channel section. A wide variety of additional tools can be utilized with the overall apparatus 10 since both tensile and compressive grasping can be attained through the independently controlled top and bottom elongate arms 20 and 22.

In the embodiment shown in FIG. 6, the assembly of the overall apparatus 10 is essentially the same as has been described. In the operation of the overall assembly of FIG. 6, the versatility of independently controlled elongate arms is used. Also, the nonparallel orientation of the top and bottom elongate arms 20 and 22 permits the attached tools to move into a position unattainable by a strictly parallel elongate arm arrangement. While an electrode arrangement has been shown in FIG. 6, it is to be understood that other tools can be employed equally as well.

Another embodiment of the present invention is shown in FIGS. 7 and 8. In this embodiment, the precise positioning of the top and bottom elongate arms 20 and 22 is controlled. As has been previously mentioned, each elongate arm has an independent linear motion achieved through the action of separate fluid actuators, such as 26 and 28. Because of fluctuations in the fluid medium supply to the fluid actuated cylinders 26 and 28, it is possible that one fluid actuator may overpower the other, thus causing the clamped workpiece to drift or translate. The particular embodiment of the present invention, as shown in FIGS. 7 and 8, makes it possible to minimize any drift that may be caused by a fluid medium imbalance to the independently controlled fluid actuated cylinders 26 and 28.

As shown in FIG. 7, each top and bottom elongate arm 20 and 22 has independent linear motion because of their attachment to separate fluid actuated cylinders 26 and 28. For example, when the top elongate arm 20 is moved to the right, as viewed in FIG. 7, the pinion gear 180, which is engaged with the rack gear 168, will rotate and move or translate also to the right. The pinion gear 180 can translate because its pinion shaft is journaled in slide blocks 184 which, in turn, slide along the milled slot 186 in the cover plate 122 and the corresponding milled slot in the milled section 120. Thus, the top elongate arm 20 can move linearly without any undue force being applied to the bottom elongate arm 22. In a similar manner, the bottom elongate arm 22 can move linearly without affecting the position of the top elongate arm 20. In both of the above examples, the pinion gear 180 merely rotates and translates to the right or to the left depending upon which direction the elongate arm is moved. Both the top and bottom elongate arms 20 and 22 can be moved simultaneously, if desired. When both of the top and bottom elongate arms 20 and 22 are moved to the right, as viewed in FIG. 7, under the influence of their respective fluid actuated cylinders 26 and 28, the pinion gear 180 translates, but does not rotate. Once again, the pinion gear 180 can translate because the journaled ends of the pinion shaft 182 are not restrained. Thus, as described above, the pinion gear 180 undergoes a combination of rotation and translation. By way of example, when the overall apparatus 10 employs a set of clamp tools that are clamped on a workpiece, there may be a slight drift of the workpiece in one direction or the other caused by an inbalance in fluid pressure that is being applied to the fluid actuated cylinders 26 and 28. To prevent the objectionable translation of the workpiece, the slide blocks 184 are immobilized by the clamping action afforded by the electromagnetic clutch 190. When the pinion gear 180 can no longer translate, any inbalance force that is being applied to one of the top and bottom elongate arms 20 and 22 will be immediately transferred in part to the other elongate arm, thus preventing drift or translation of the workpiece. While an electromagnetic clutch has been set forth by way of example, those skilled in the art will immediately recognize alternate modes for immobilizing the slide blocks 184 with respect to the milled slot 186.

While the illustrative embodiments of the present invention have been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. An apparatus for moving a tool into and out of engagement with a workpiece comprising:

a housing block of elongate configuration having a plurality of spaced apart elongate longitudinally disposed arm guides traversing the length of said housing block, said housing block having one end and an opposite end;

an elongate arm disposed in each of said plurality of spaced apart elongate longitudinally disposed arm guides, each said elongate arms having one end extending from said one end of said housing block and an opposite end located within said opposite end of said housing block;

an end cap positioned over said opposite end of said housing block;

a plurality of power sources mounted to said end cap, each of said plurality of power sources having a piston rod extending into a respective one of each of said plurality of spaced apart elongate longitudinally disposed arm guides, each of said piston rods further having one end removably attached to a respective one of said elongate arms disposed in each of said spaced apart elongate longitudinally disposed arm guides; and means for attaching said tool to one of said elongate arms so that said apparatus can perform useful work on said workpiece.

2. The apparatus of claim 1, wherein each of said plurality of power sources is a fluid actuated cylinder that is attached to said end cap and further wherein said piston rod extends into said housing block for reciprocal movement relative thereto.

3. The apparatus of claim 1, wherein said means for attaching further comprises a second tool attached to another of said elongate arms whereby said tool attached to said one of said elongate arms and said second tool attached to said another of said elongate arms perform work on said workpiece.

4. The apparatus of claim 1, wherein each said piston rod is removably attached to said elongate arm by a quick disconnect coupling.

5. A dual action apparatus for the manipulation of a plurality of tools comprising:
- a housing block having two spaced apart elongate longitudinally disposed arm guides provided therein, said two spaced apart elongate longitudinally disposed arm guides being arranged generally parallel to one another from one end of said housing to an opposite end thereof;
- an elongate arm disposed in each of said two spaced apart elongate longitudinally disposed arm guides, each of said elongate arms having one end protruding from said one end of said housing block and an opposite end located within said two spaced apart elongate longitudinally disposed arm guides;
- an end cap attached to said opposite end of said housing block, said end cap spanning both of said two spaced apart elongate longitudinally disposed arm guides;
- a first power source attached to said end cap, said first power source having a piston rod extending into one of said two spaced apart elongate longitudinally disposed arm guides of said housing block, said piston rod further being attached to said opposite end of said elongate arm disposed in said one of said two spaced apart elongate longitudinally disposed arm guides;
- a second power source attached to said end cap, said second power source having a piston rod extending into the other of said two spaced apart elongate longitudinally disposed arm guides of said housing block, said piston rod further being attached to said opposite end of said elongate arm disposed in said other of said two spaced apart elongate longitudinally disposed arm guides;
- a quick disconnect coupling mounted between each said first and second power sources and each said respective one of said elongate arms disposed in said two spaced apart elongate longitudinally disposed arm guides; and
- means for attaching a respective one of said plurality of tools to each of said elongate arms so that said apparatus can perform useful work on a workpiece.

6. The apparatus of claim 5, wherein said two spaced apart elongate longitudinally disposed arm guides are arranged oblique to one another so that a projection of the axes of said two spaced apart elongate longitudinally disposed arm guides converge at a predetermined distance from said housing block.

7. The apparatus of claim 5, wherein a telescoping shield circumscribes said protruding end of each said elongate arm.

8. The apparatus of claim 5 further comprising a plurality of pivotable support members coupled externally to said housing block for support and rotation of said apparatus.

9. The apparatus of claim 5 further comprising stop means attached to the exterior of said housing block, said stop means being common to both said elongate arms and adapted to limit the movement of said elongate arms.

10. A dual action apparatus for the manipulation of a plurality of tools comprising:
- a housing block having two spaced apart elongate arm guides provided therein, said two spaced apart elongate arm guides being in communication with each other over the majority of their axial extent, said two spaced apart elongate arm guides each having a rectangular cross-sectional configuration throughout their axial extent and further being oriented parallel to one another;
- a first elongate arm disposed in one of said two spaced apart elongate arm guides, said first elongate arm having one end protruding from said housing block and an opposite end coupled by means of a quick disconnect fitment to a linearly displaceable first power source;
- a second elongate arm disposed in the other of said two spaced apart elongate arm guides, said second elongate arm having one end protruding from said housing block and an opposite end coupled by means of a quick disconnect fitment to a linearly displaceable second power source, said second power source being independent of said first power source;
- an end cap positioned over and attached to one end of said housing block, said first and second power sources being attached to said end cap;
- a rack gear coupled to each of said first and second elongate arms, each of said rack gears having a linear orientation along a portion of the axial extent of said first and second elongate arms;
- a pinion gear disposed within said housing block and in engagement with said rack gears; and
- a plurality of movable slide blocks mounted to said housing block; a pinion shaft having one end journalled to one of said plurality of movable slide blocks, an opposite end journalled to another of said plurality of movable slide blocks and a central portion mounted to said pinion gear.

11. The apparatus of claim 10, wherein said pinion shaft is fixed against rotation and said pinion gear rotates around said pinion shaft.

12. The apparatus of claim 10, wherein said rack gears extend over a major extent of the axial extent of said first and second elongate arms.

13. The apparatus of claim 10, wherein said plurality of slide blocks are positioned in milled slots in said housing block, said milled slots being oriented parallel to said first and second elongate arms.

14. The apparatus of claim 10, further comprising means coupled to at least one of said plurality of slide blocks to immobilize the linear movement of said pinion gear.

15. The apparatus of claim 14, wherein said means is in the form of an electromagnetic clutch.

16. The apparatus of claim 15, wherein said electromagnetic clutch is positioned adjacent to a cover plate of said housing block.

17. The apparatus of claim 10, wherein said pinion gear is positioned at the midpoint of the axial extent of said rack gears when said first and second elongate arms are in the fully retracted position within said housing block.

18. The apparatus of claim 10, wherein said pinion gear can rotate and translate simultaneously.

* * * * *

UNITED STATES PATENT AND TRADEMARK OFFICE
CERTIFICATE OF CORRECTION

PATENT NO. : 5,033,555

DATED : July 23, 1991

INVENTOR(S) : Carter et al

It is certified that error appears in the above-identified patent and that said Letters Patent is hereby corrected as shown below:

Column 4, line 38, after "12" insert a comma --- , ---.

Column 8, line 1, delete "17)" and insert ---- 170 ----.

Column 8, line 2, delete "su-faces" and insert ---- surfaces ----.

Signed and Sealed this

Twentieth Day of October, 1992

Attest:

DOUGLAS B. COMER

*Attesting Officer*   *Acting Commissioner of Patents and Trademarks*